United States Patent [19]

van de Ven et al.

[11] Patent Number: 4,647,465
[45] Date of Patent: Mar. 3, 1987

[54] WHIPPABLE, NON-HOMOGENIZED CREAM HAVING A FAT CONTENT

[75] Inventors: Martinus J. M. van de Ven, Woerden; Zeger Provily, Breukelen, both of Netherlands

[73] Assignee: Melkunie Holland B.V., Woerden, Netherlands

[21] Appl. No.: 776,115

[22] PCT Filed: Jan. 14, 1985

[86] PCT No.: PCT/NL85/00003
 § 371 Date: Sep. 9, 1985
 § 102(e) Date: Sep. 9, 1985

[87] PCT Pub. No.: WO85/02979
 PCT Pub. Date: Jul. 18, 1985

[30] Foreign Application Priority Data

Jan. 13, 1984 [NL] Netherlands ............... 8400121

[51] Int. Cl.⁴ .................................... A23C 13/14
[52] U.S. Cl. .................... 426/570; 426/613; 426/586; 426/491; 426/492
[58] Field of Search ............ 426/570, 586, 491, 492, 426/613

[56] References Cited

U.S. PATENT DOCUMENTS

| | | | |
|---|---|---|---|
| 2,414,837 | 1/1947 | Riggs | 426/586 |
| 3,359,116 | 12/1967 | Little | 99/54 |
| 3,370,955 | 2/1968 | Little | 99/54 |
| 3,468,671 | 9/1969 | Bratland | 426/570 |
| 3,505,077 | 4/1970 | Bratland | 426/570 |
| 3,607,301 | 9/1971 | Bratland | 426/570 |
| 4,251,560 | 2/1981 | Dell et al. | 426/565 |
| 4,547,385 | 10/1985 | Lindstam | 426/586 |
| 4,556,574 | 12/1985 | Andersson | 426/570 |

FOREIGN PATENT DOCUMENTS 2242033 3/1975 France .

OTHER PUBLICATIONS

Patents Abstracts of Japan, vol. 5, No. 67.
Voedingsmiddelentechnologie, vol. 3, No. 8, 2/23/72, J. E. Schaap, "Hoe Kunnen de Opklopeigenschappen van Slagroom Worden Vergeterd?".
Food Science & Technology, vol. 13, No. 4, 1978, H. Cooper, "Preparation of Whipping Cream From Frozen Cream?".
Chemical Abstracts, vol. 97, No. 21, Nov. 1982, H. De Moor et al.

Primary Examiner—Jeanette Hunter
Attorney, Agent, or Firm—Buell, Ziesenheim, Beck & Alstadt

[57] ABSTRACT

The invention relates to a whippable, non-homogenized cream having a fat content of 20 to 30% by weight and a pH of 6.2 to 6.5, which contains 0.2 to 0.4% by weight of at least one emulsifying agent consisting of a mixture of distilled monoglycerides in a carrier, wherein the weight ratio of saturated fatty acids to unsaturated fatty acids in the fatty acid ester is between 80:20 and 20:80, 0.2 to 0.4% by weight of at least one binder based on starch, as well as 0.03 to 0.06% by weight of carragheenate as a stabilizer, and to a method wherein at least one of said emulsifying agent, said binder, said carragheenate and at least one organic and physiologically acceptable acid are dispersed in milk and the amount of non-homogenized cream required to achieve the desired fat content in the final product.

94 Claims, 45 Drawing Figures

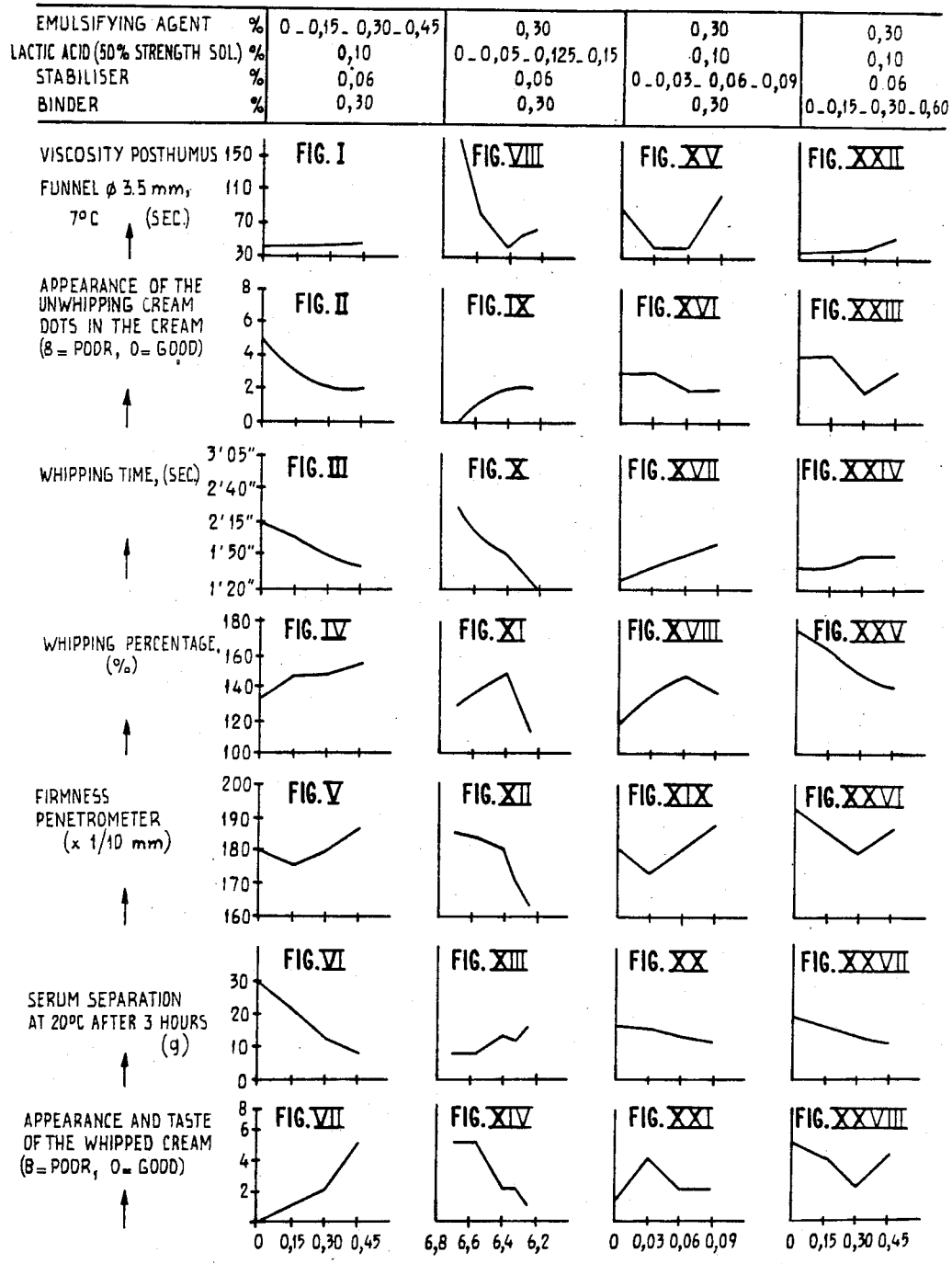

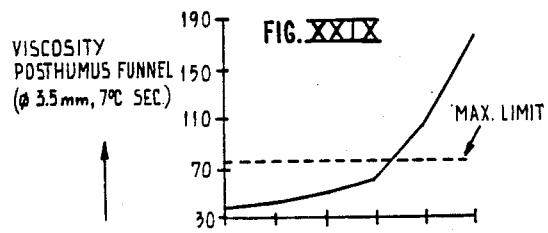
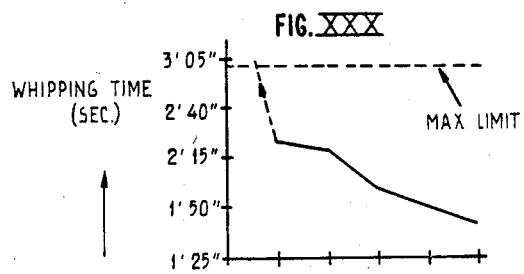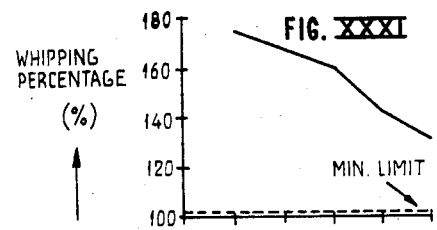
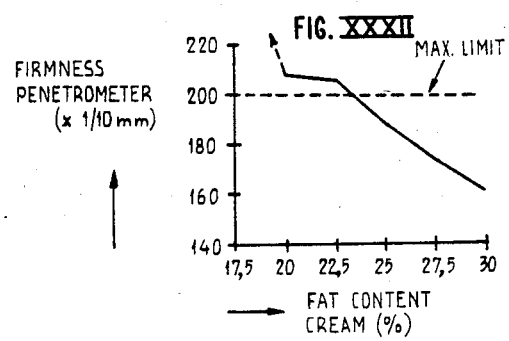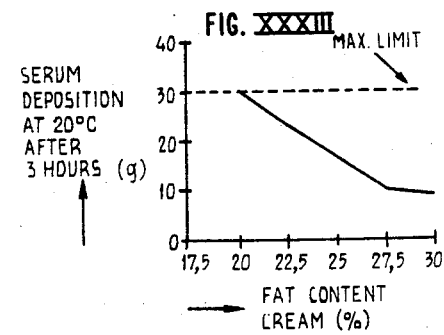

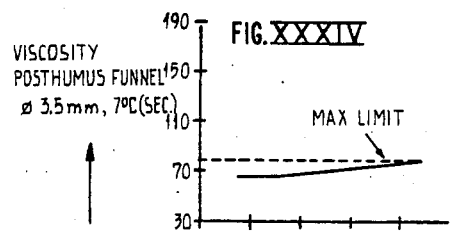
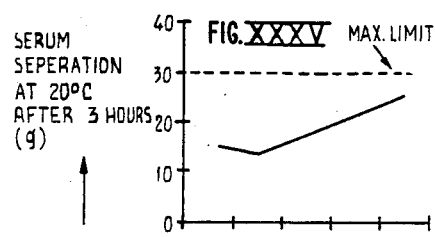
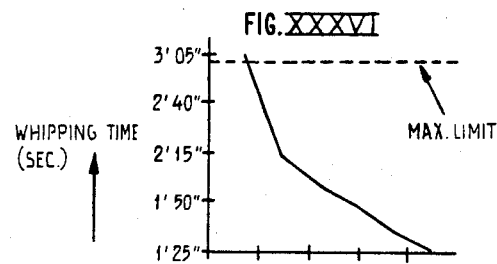
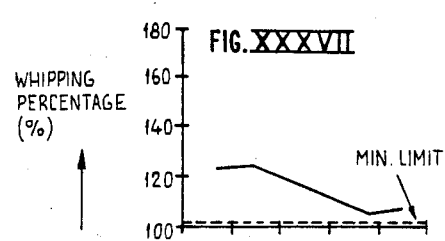
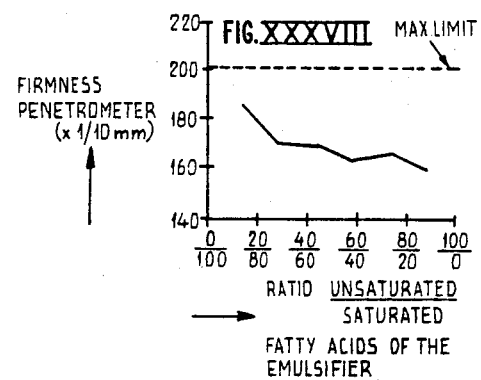
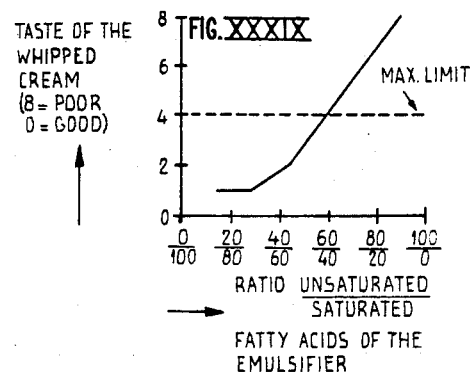

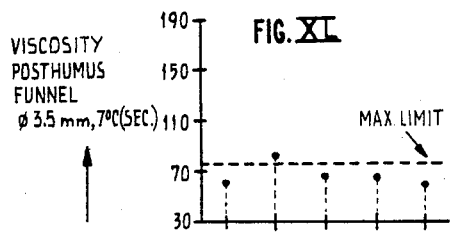
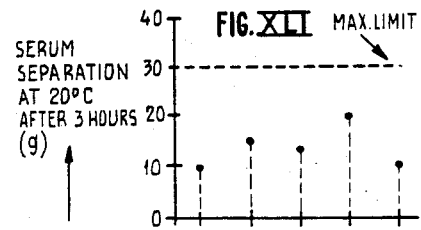
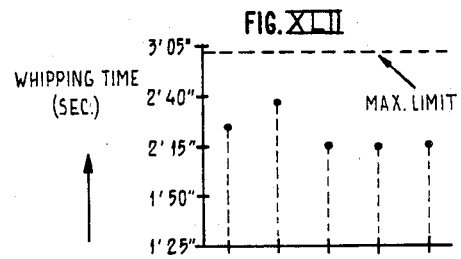
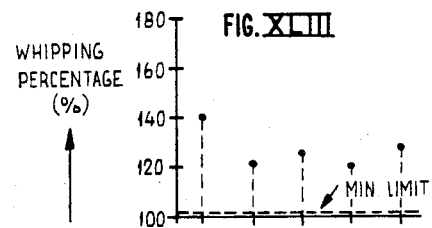
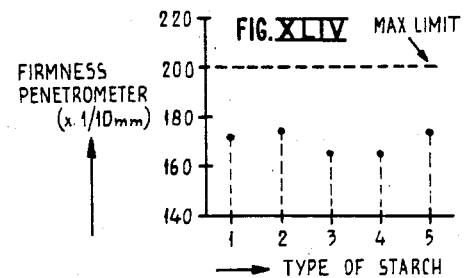
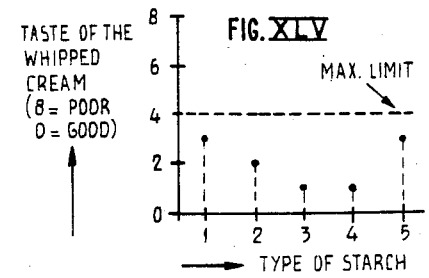

WHIPPABLE, NON-HOMOGENIZED CREAM HAVING A FAT CONTENT

The invention relates to a whippable, non-homogenised cream having a fat content of 20 to 30% by weight and a pH of 6.2 to 6.5, which contains 0.2 to 0.4% by weight of at least one emulsifying agent consisting of a mixture of distilled monoglycerides in a carrier, wherein the weight ratio of saturated fatty acids to unsaturated fatty acids in the fatty acid ester is between 80:20 and 20:80, 0.2 to 0.4% by weight of at least one binder based on starch, as well as 0.03 to 0.06% by weight of carragheenate as a stabiliser, and to a method for its preparation.

It has been known for many decades that cream having a fat content of at least 30% by weight can be whipped to give whipped cream. Although, because inter alia of the great dependence of the whipping device used, there are no standard requirements in respect of the whipping properties of fresh whipping cream, it is nevertheless generally assumed that a cream of this type should have the following properties:

whipping time: not more than 3 minutes
whipping percentage: not less than 100%
firmness penetrometer: not more than 200 (×0.1 mm)
serum separation: 20° C., not more than 30 g after 3 hours, 7° C., not more than 10 g after 3 hours
viscosity of the cream: not more than 75 sec (Posthumus funnel)

Market research has revealed that there is a need for a whippable cream having a fat content of 20 to 30% by weight, the properties of which after whipping meet the above requirements as far as possible.

"Deutsche Molkerei-Zeitung" 1742–1743 (1973) discloses a method in which a whippable cream with a whipping percentage of at least 100% and in which very little serum separation takes place after standing for 2 hours, is obtained by mixing 2 parts of cream having a fat content of 34% by weight and a pH of 6.6 to 6.7 with 1 part of skim-milk which has a pH of 6.5 to 6.6 and which is inoculated with a lactic acid-forming acid starter and incubated till a pH of 5.6 was achieved. The fat content of the mixture then was 23 to 23.5% by weight, while the pH was 6.16 to 6.22.

According to this publication, seven (A up to and incl. G) tests have been carried out. Of these, Tests A up to and incl. D are not suitable for use on a commercial scale since the use of unpasteurised cream and/or of skim-milk in a commercial product seems unjustifiable. Tests E up to and including G have been carried out by mixing soured skim-milk which was obtained by inoculating and incubating at 45° C. with a deep-frozen yoghurt culture, to a pH of 5.7, with cream having a fat content of 41.2% by weight. Said mixture had a fat content of 25% by weight and a pH of 6.2. Variants E up to and incl. G were prepared by using this mixture.

Blank (cream+non-soured skim-milk), 10 minutes at 60° C., thereafter brief heating at 90° C., followed by cooling.

E: Cream+"soured" skim-milk, 10 minutes at 60° C., thereafter brief heating at 90° C., followed by cooling.

F: Cream+"soured" skim-milk, brief heating at 90° C., followed by cooling.

G: Cream+"soured" skim-milk, 5 minutes at 90° C., followed by cooling.

RESULTS

After storage at 7° C. for 3 days, the samples were whipped using a Philips handmixer HM 3060 (Setting 2).

Blank: whipped for 3 minutes; air was not retained as a result of which the product could not be whipped.

E: Whipped for 3 minutes; air was retained, but the structure of the whipped cream was much too soft and too light. The taste of the whipped cream was unacceptable.

F: Whipped for 3 minutes; the structure of the product was even softer than that of sample E. Taste as for E.

G: whipped for 3 minutes; the results were the same as in sample F.

Accordingly, the whipping properties of a cream obtained by this method are not comparable with those of whipped cream. Moreover, the taste of the soured cream was different.

It has been found that a whipped cream having a fat content of 20 to 30% by weight and properties which are well comparable with those of whippable creams having a fat content of more than 30% by weight can be obtained by dispersing at least one emulsifying agent consisting of a mixture of distilled monoglycerides in a carrier, wherein the weight ratio of saturated to unsaturated fatty acids in the fatty acid ester is between 80:20 and 20:80, a binder based on starch, at least one organic and physiologically acceptable acid and a carragheenate as a stabiliser, in milk, while stirring thoroughly, and by combining amounts of this dispersion(s) with an amount of non-homogenised cream such, that the mixture has the desired fat content of 20 to 30% by weight, the content of emulsifying agent and of binder is 0.2 to 0.4% by weight in each case, the content of stabiliser is 0.03 to 0.06% by weight and the pH is at the desired value.

The method is preferably carried out as follows:

the dry ingredients are mixed and dispersed in whole milk by using a Turrax stirrer;

this dispersion is added with stirring to pasteurised cream (40% fat), so that the fat content of the cream is standardised to 25%;

a lactic acid solution is carefully added with stirring; cream is pasteurized for 30 seconds at 115° C. in a blade pasteuriser, and cooled to below 10° C.; it is packaged into beakers and stored in a refrigerator at 7° C.;

the cream is examined for appearance and whipping properties after storage for 2 to 3 days.

The fat content of the whippable cream to be prepared is preferably 25% by weight.

The pH of the whippable cream is preferably 6.3.

The cream to be used for preparing a whippable cream having a fat content of 20 to 30% by weight may not have been homogenised. It has been found that the desired whipping properties cannot be obtained when homogenised cream is used. In order nevertheless to obtain, starting from non-homogenised cream, good emulsification of the fat in cream with reduced fat content, an emulsifying agent has of course to be added. However, most emulsifying agents can only be used if they are added to the fat phase and subsequently a homogenisation of the fat phase in the water phase is carried out. Since the whipping properties are adversely affected in this case too, the only emulsifying agents which can be used are those which can be added to the water phase without homogenising.

Emulsifying agents which meet this condition and moreover have no adverse effects on the taste are those which consist of distilled monoglycerides, in hydrogenated soya oil as a carrier.

The emulsifying agent is preferably a mixture of distilled monoglycerides and 20% by weight of hydrogenated soya oil.

The fatty acid ester of this emulsifying agent preferably consists of 71% by weight of saturated fatty acids and of 29% by weight of unsaturated fatty acids.

The presence of the emulsifying agent in the above amounts and with the preferred ratio of saturated to unsaturated fatty acids is of great importance for the whipping properties of the end product, in particular for shortening the whipping time, increasing the whipping percentage and reducing serum separation. The richer the emulsifying agent in unsaturated fatty acids, the better are the whipping properties. Since, however, the unsaturated fatty acids cause deficiencies in taste, there is a limit to which these components can be present.

Percentages of more than 0.4% by weight have an adverse effect on taste, the appearance and the firmness of the whipped cream.

The whippable cream according to the invention preferably contains 0.3% by weight of emulsifying agent.

The binder to be used according to the invention is preferably a modified water-soluble starch. The binder contributes to improving the taste and the firmness of the whippable cream. Instead of modified water-soluble starch it is also possible to use natural starch and cold-soluble starch varieties.

The whippable cream according to the invention preferably contains 0.3% by weight of binder.

The carragheenate serves for stabilising the cream to pasteurisation. This stabiliser therefore acts as a protective colloid for the proteins contained in the cream. Furthermore, the stabiliser influences the viscosity of the cream. In principle, most carragheenates are suitable for this purpose. It is, however, of great importance to select a stabiliser which is optimum for the particular process conditions (type of pasteuriser and pasteurisation temperature etc.), which stabiliser provides sufficient protection for the product and scarcely raises the viscosity.

Preference is given to carragheenates of the iota type in which about 15% by weight of orthophosphate are present.

If the cream having a reduced fat content contains less then 0.03% by weight of stabiliser the viscosity will become too high as a result of an excessively low stability against heating, while shifting of the proteins will occur.

If the cream having a reduced fat content contains more than 0.06% by weight of stabiliser, the viscosity will become too high as result of the thickening action of the stabiliser.

The cream according to the invention preferably contains 0.05% by weight of stabiliser.

It has been found that the influence of the pH on the properties of the whipped or non-whipped cream is very pronounced. However, the pH can be reduced in various ways. It is therefore determined whether there are differences between lactic acid and citric acid as agents for reducing the pH. It has been found that the whipping properties of these 2 variants hardly differ from one another. The only difference is in the taste of the whipped cream. When using citric acid a somewhat more acid taste is noticed than when using lactic acid, but this difference is minimal. Preference is therefore given to lactic acid, in particular 50% by weight lactic acid in water.

Although it is preferred to subject the end product to a pasteurisation, for example for 30 seconds at 115° C., it is very well possible to prepare a cream, having a fat content of 20 to 30% by weight, which has limited storability, but which is readily whippable, without pasteurising the end product. In particular, a readily whippable product can be obtained if the dispersion(s) consisting of binder, emulsifying agent and stabiliser in milk is first heated for 5 minutes at 80° C. before it is mixed with the cream, is then cooled down and mixed with pasteurised cream.

FIGS. I up to and including XXVIII show the effect of different amounts of emulsifying agent, lactic acid, stabiliser and binder on the properties of non-whipped and whipped non-homogenised cream having a fat content of 25% by weight.

The cream having a reduced fat content is prepared as follows:
1. the dry ingredients are mixed and dispersed in whole milk by using a Turrax stirrer
2. this dispersion is added with stirring to non-homogenised pasteurised cream having a fat content of 40% by weight, as a result of which cream having a fat content of 25% by weight is obtained
3. the lactic acid solution is then carefully added with stirring
4. the cream having a reduced fat content is pasteurised in a blade pasteuriser for 30 seconds at 115° C. and is subsequently cooled to below 10° C.
5. the cream is packaged in beakers and is stored in a refrigerator at 7° C.
6. after 3 days the cream is assessed for appearance and properties.

The emulsifying agent used consists of a mixture of distilled monoglycerides and 20% by weight of hydrogenated soya oil, where the fatty acid ester of the emulsifying agent consists of 71% by weight of saturated fatty acids and of 29% by weight of unsaturated fatty acids.

The stabiliser used is a carragheenate which contains 15% by weight of orthophosphate.

The binder is a modified water-soluble starch.

The followig methods are used for assessing the properties of the cream and of the whipped cream:
1. Viscosity of the cream:
    A Posthumus funnel having an outlet opening of diameter $3\frac{1}{2}$ mm is used for this purpose. Measuring temperature 7° C.
2. Appearance of the cream:
    It is determined on the reverse side of a spoon whether the structure of the cream is smooth and whether there are dots present in the cream.
3. Whipping time:
    The cream is whipped using a Philips handmixer HM 3060, Setting 2, with the aid of the whisks supplied. Prior to whipping, the cream has to be stored at 7° C. for at least 24 hours.
    The ambient temperature during whipping is about 20° C.
4. Whipping percentage:
    The whipping percentage is defined as the percentage increase in volume and is calculated in accordance with the formula:

$$\% \text{ whipping} = (G_1 - G_2)/G_2 \times 100\%,$$

wherein:

$G_1$ = the weight of a volume of unwhipped cream $G_2$ = the weight of the same volume of whipped cream 5. Firmness:

The firmness is measured using a Sommer/Runge type KG penetrometer and is defined as the penetration depth in 1/10 mm of a falling rod (weight 15.7 g) having a measurement cone (cone angle = 90°; weight = 39.7 g), after a penetration period of 10 seconds.

6. Serum separation:

The serum separation of whipped cream is expressed as the amount, in grams, of serum which separates from 250 ml of whipped cream after a predetermined period (1 hour, 2 hours, 3 hours) at 20° C.

7. Appearance and taste of the whipped cream:

In this, the whipped cream is subjected to an organoleptic test and the extent to which the whipped cream deviates from this is determined.

For example, deficiency in taste as a result of added ingredients or deficiency in structure (too light, too fluffy).

FIG. I shows that varying the content of emulsifying agents hardly changes the viscosity and remains below 75 sec.

FIG. II shows that in respect of varying the content of emulsifying agent the best appearance of unwhipped cream is achieved when the cream contains 0.30 and 0.40% by weight respectively of the emulsifying agent.

FIG. III shows that the whipping time of cream becomes shorter with increasing content of emulsifying agent and remains below 3 minutes.

FIG. IV shows that the whipping percentage substantially increases with an increase in emulsifying agent of 0 to 0.15% by weight, and that a further increase in the emulsifying agent content up to 0.2 to 0.4% by weight results in no substantial increase in the whipping percentage. All the measured values are above 100%.

FIG. V shows that, after initially increasing during the transition from 0 to 0.15% by weight of emulsifying agent, the firmness of the whipped cream substantially decreases with increasing emulsifying agent content to 0.20 to 0.40% by weight, but remains below 200.

FIG. VI shows that the serum separation after 3 hours at 20° C. decreases almost proportionally from 30 to 10 g, with increasing emulsifying agent content from 0.2 to 0.4% by weight.

FIG. VII shows that in order to obtain a satisfactory appearance and taste, the percentage of emulsifying agent should preferably be not more than 0.4% by weight.

FIG. VIII shows that the viscosity is lowest at a pH of 6.4. If the pH is increased to 6.5, the limit of 75 sec. is approached; if the pH is reduced from 6.4 to 6.2, the viscosity remains below 75 sec.

FIG. IX shows that reducing the pH of the cream from 6.5 to 6.2 has hardly any effect on the appearance of unwhipped cream.

FIG. X shows that reducing the pH from 6.5 to 6.2 results in a drop in the whipping time from 2 minutes to 1½ minutes.

FIG. XI shows that the whipping percentage between pH 6.2 and 6.5 always remains above 100% and reaches a maximum of 140% at pH 6.4.

FIG. XII shows that the firmness of the whipped cream increases from 180 to 165 during the transition from pH 6.5 to 6.2.

FIG. XIII shows that the serum separation increases from 10 to 15 g when the pH is reduced from 6.5 to 6.2.

FIG. XIV shows that reducing the pH from 6.5 to 6.2 has a favourable effect on the appearance and the taste of the whipped product.

It is clear from FIG. XV that, if the cream contains 0.03 to 0.06% by weight of stabiliser, the viscosity remains clearly below 75 sec.

FIG. XVI shows that the appearance of the unwhipped cream is acceptable in the presence of 0.03 to 0.06% by weight of stabiliser.

FIG. XVII shows that the whipping time increases from 100 sec. to 2 minutes if the stabiliser content is increased from 0.03 to 0.06% by weight.

FIG. XVIII shows that the whipping percentage in the case of a stabiliser content of 0.03 to 0.06% is above 130% and reaches a maximum of 140% in the case of a stabiliser content of 0.06%.

FIG. XIX shows that the firmness of the whipped cream in the case of a stabiliser content of 0.03–0.06% by weight decreases linearly from 170 to 180, and thus remains clearly below 200.

FIG. XX shows that in the case of a stabiliser content of 0.03 to 0.06% by weight the serum separation is only 10 to 15 g.

FIG. XXI shows that the appearance and taste are satisfactory with a stabiliser range of 0.03 to 0.06% by weight.

FIG. XXII shows that the viscosity of the cream at a binder content of 0.2 to 0.4% by weight remains clearly below 75 sec.

FIG. XXIII shows that the appearance of the unwhipped cream at a binder content of 0.2 to 0.4% by weight is satisfactory or very satisfactory respectively.

FIG. XXIV shows that the whipping time of the cream at a binder content of 0.2 to 0.4% by weight also remains clearly below 3 minutes.

FIG. XXV shows that the whipping percentage at a binder content of 0.2 to 0.4% by weight varies from 160 to 140%.

FIG. XXVI shows that the firmness of the whipped cream at a binder content of 0.2 to 0.4% by weight remains clearly below 200.

FIG. XXVII shows that at a binder content of 0.2 to 0.4% by weight the serum separation is between 10 and 20 g.

FIG. XXVIII shows that at a binder content of 0.2 to 0.4% by weight the appearance and taste are satisfactory or very satisfactory respectively.

The effect of the fat content of the cream on the properties of the cream and of the whipped cream is clear from FIGS. XXIX–XXXIII.

The following components have been added to the cream with which the tests have been carried out.

0.3% by weight of emulsifying agent 0.3% by weight of binder 0.06% by weight of stabiliser 0.11% by weight of 50 percent lactic acid FIG. XXIX shows that at a fat content of more than 27.5% by weight the viscosity rapidly increases to more than 75 sec.

FIG. XXX shows that at a fat content of less than 20% by weight the desired whipping time of not more than 3 minutes can no longer be achieved.

FIG. XXXI shows that at a fat content of 20 to 30% by weight the whipping percentage is 175 to 130%.

FIG. XXXII shows that at a fat content of 22.5% by weight of fat the firmness limit of 200 is exceeded, while at higher fat contents the firmness of the whipped cream remains below this limit.

FIG. XXXIII shows that at a fat content of 20 to 30% by weight the serum separation does not exceed the maximum limit of 30 g.

The effect of the ratio of unsaturated fatty acids to saturated fatty acids in the emulsifying agent is clear from FIGS. XXXIV–XXXIX.

The following components have been added to the cream with which the tests have been carried out.
0.3% by weight of emulsifying agent
0.3% by weight of binder
0.06% by weight of stabiliser
0.11% by weight of 50 percent lactic acid.

FIG. XXXIV shows that the maximum limit of 75 sec. for the viscosity is not exceeded if an emulsifying agent is used in which the ratio of unsaturated fatty acids to saturated fatty acids is 20:80 to 80:20.

FIG. XXXV shows that the limit of 30 g for the serum separation is not exceeded when an emulsifying agent is used in which the ratio of unsaturated fatty acids to saturated fatty acids is 20:80 to 80:20.

FIG. XXXVI shows that the whipping time is affected and the maximum limit of 3 minutes is not exceeded when an emulsifying agent is used in which the ratio of unsaturated fatty acids to saturated fatty acids is 20:80 to 80:20.

FIG. XXXVII shows that the whipping percentage always remains above the minimum value set when emulsifying agents are used in which the ratio of unsaturated fatty acids to saturated fatty acids is 20:80 to 80:20.

FIG. XXXVIII shows that the maximum limit of 200 for the firmness of the whipped cream is not exceeded when an emulsifying agent is used in which the ratio of unsaturated fatty acids to saturated fatty acids is 20:80 to 80:20.

FIG. XXXIX shows that in respect of the taste of the whipped cream the ratio of unsaturated fatty acids to saturated fatty acids should preferably be between 20:80 and 60:40.

The effect of the type of starch used on the properties of the cream and of the whipped cream can be seen in FIG. XL up to and incl. XLV.

The tests are carried out using a cream to which the following components have been added.
0.3% by weight of emulsifying agent
0.3% by weight of binder
0.06% by weight of stabiliser
0.11% by weight of 50 percent lactic acid.

The following types of starch have been used:
1 = cold-soluble starch,
2 = natural maize starch,
3 = modified starch, grade H,
4 = modified starch, slightly esterified, grade I,
5 = modified starch, highly esterified, grade I.

The different effects of the types of carragheenate investigated on the properties of the cream and of the whipped cream are given in Table 1. In these tests, pasteurisation has always been carried out at 95° C. in a tube pasteuriser.

It can be seen in this table that carragheenate of the iota type which contains about 15% by weight of orthophosphate gives the most desirable result in respect of viscosity and appearance.

The serum deposition remains below the limit of 30 g within 3 hours.

TABLE 1

Effect of the type and amount of stabiliser on the properties of the cream during pasteurising with the aid of a tube pasteuriser (pasteurisation temperature: 95° C.)

| Formulation 0.3% of emulsifying agent 0.3% of binder 0.1% of lactic acid (50% sol.) Type of stabiliser in % | Cream | | | Whipped cream | | | Serum deposition at 20° C. | | |
|---|---|---|---|---|---|---|---|---|---|
| | Viscosity (sec) | pH | Appearance | Whipping time | Whipping % | Firmness | 1 h | 2 h | 3 h |
| 0.04 Kappa-carragheenate A | 169 | 6.40 | too thick | 2'15" | 110 | 173 | 1 | 3 | 6 |
| 0.04 Lambda-carragheenate B | 84 | 6.39 | slightly thick | 1'55" | 107 | 165 | 3 | 7 | 10 |
| 0.04 50% Kappa-carragheena A 50% Lambda-carragheenate B | 121 | 6.40 | too thick | 2'20" | 118 | 165 | 1 | 3 | 6 |
| 0.04 Lambda carragheenate C | 84 | 6.42 | slightly thick | 2'20" | 117 | 177 | 3 | 6 | 8 |
| 0.02 Iota-carragheenate D | 55 | 6.45 | good | 2'15" | 143 | 169 | 4 | 8 | 12 |
| 0.04 Iota-carragheenate D | 58 | 6.45 | good | 2'20" | 146 | 169 | 4 | 9 | 13 |
| 0.06 Iota-carragheenate D | 65 | 6.45 | good | 2'00" | 144 | 179 | 5 | 10 | 15 |
| 0.02 Iota-carragheenate + orthophosphate E | 51 | 6.44 | good | 1'50" | 172 | 165 | 3 | 8 | 11 |
| 0.04 Iota-carragheenate + orthophosphate E | 42 | 6.43 | good | 1'50" | 170 | 180 | 8 | 16 | 21 |
| 0.06 Iota-carragheenate + orthophosphate E | 45 | 6.43 | good | 2'10" | 183 | 170 | 8 | 16 | 21 |
| 0.08 Iota-carragheenate + orthophosphate E | 69 | 6.45 | good | 2'10" | 165 | 173 | 4 | 10 | 15 |

We claim:
1. Whippable, non-homogenized cream, having a fat content of 20 to 30% by weight and a pH of 6.2 to 6.5, which contains
0.2 to 0.4% by weight of at least one emulsifying agent consisting of a mixture of distilled monoglycerides in hydrogenated soya oil, wherein the weight ratio of saturated fatty acids to unsaturated fatty acids in the fatty acid ester is between 80:20 and 20:80,
0.2 to 0.4% by weight of at least one binder selected from the group consisting of modified water soluble starch and cold soluble starch varieties and

0.03 to 0.06% by weight of carragheenate as a stabiliser.

2. Whippable, non-homogenised cream according to claim 1, wherein the fat content is 25% by weight.

3. Whippable, non-homogenised cream according to claim 1 or 2, wherein the pH is 6.3.

4. Whippable, non-homogenised cream according to claim 1 or 2, wherein the emulsifying agent consists of a mixture of distilled monoglycerides and 20% by weight of hydrogenated soya oil.

5. Whippable, non-homogenised cream according to claim 1 or 2, wherein the fatty acid ester of the emulsifying agent consists of 71% by weight of saturated fatty acids and of 29% by weight of unsaturated fatty acids.

6. Whippable, non-homogenised cream according to claim 1 or 2, wherein the cream contains 0.3% by weight of emulsifying agent.

7. Whippable, non-homogenised cream according to claim 1 or 2, wherein the binder is a modified water-soluble starch.

8. Whippable, non-homogenised cream according to claim 1 or 2, wherein the cream contains 0.3% by weight of a binder.

9. Whippable, non-homogenised cream according to claim 1 or 2, wherein the stabiliser is an iota-carragheenate, in which about 15% by weight of orthophosphate are present.

10. Whippable, non-homogenised cream according to claim 1 or 2, wherein the cream contains 0.05% by weight of a stabiliser.

11. Whippable, non-homogenised cream according to claim 3 wherein the emulsifying agent consists of a mixture of distilled monoglycerides and 20% by weight of hydrogenated soya oil.

12. Whippable, non-homogenised cream according to claim 3 wherein the fatty acid ester of the emulsifying agent consists of 71% by weight of saturated fatty acids and 29% by weight of unsaturated fatty acids.

13. Whippable, non-homogenised cream according to claim 3 wherein the cream contains 0.3% by weight of emulsifying agent.

14. Whippable, non-homogenised cream according to claim 3 wherein the binder is a modified water soluble starch.

15. Whippable, non-homogenised cream according to claim 3 wherein the cream contains 0.3% by weight of a binder.

16. Whippable, non-homogenised cream according to claim 3 wherein the stabiliser is an iota-carragheenate, in which about 15% by weight of orthophosphate are present.

17. Whippable, non-homogenised cream according to claim 3 wherein the cream contains 0.05% by weight of a stabiliser.

18. Whippable, non-homogenised cream according to claim 4 wherein the fatty acid ester of the emulsifying agent consists of 71% by weight of saturated fatty acids and of 29% by weight of unsaturated fatty acids.

19. Whippable, non-homogenised cream according to claim 4 wherein the cream contains 0.3% by weight of emulsifying agent.

20. Whippable, non-homogenised cream according to claim 4 wherein the binder is a modified water-soluble starch.

21. Whippable, non-homogenised cream according to claim 4 wherein the cream contains 0.3% by weight of a binder.

22. Whippable, non-homogenised cream according to claim 4 wherein the stabiliser is an iota-carragheenate, in which about 15% by weight of orthophosphate are present.

23. Whippable, non-homogenised cream according to claim 4 wherein the cream contains 0.05% by weight of a stabiliser.

24. Whippable, non-homogenised cream according to claim 5 wherein the cream contains 0.3% by weight of emulsifying agent.

25. Whippable, non-homogenised cream according to claim 5 wherein the binder is a modified water-soluble starch.

26. Whippable, non-homogenised cream according to claim 5 wherein the cream contains 0.3% by weight of a binder.

27. Whippable, non-homogenised cream according to claim 5 wherein the stabiliser is an iota-carragheenate, in which about 15% by weight of orthophosphate are present.

28. Whippable, non-homogenised cream according to claim 5 wherein the cream contains 0.05% by weight of a stabiliser.

29. Whippable, non-homogenised cream according to claim 6 wherein the binder is a modified water-soluble starch.

30. Whippable, non-homogenised cream according to claim 6 wherein the cream contains 0.3% by weight of a binder.

31. Whippable, non-homogenised cream according to claim 6 wherein the stabiliser is an iota-carragheenate, in which about 15% by weight of orthophosphate are present.

32. Whippable, non-homogenised cream according to claim 6 wherein the cream contains 0.05% by weight of a stabiliser.

33. Whippable, non-homogenised cream according to claim 7 wherein the cream contains 0.3% by weight of a binder.

34. Whippable, non-homogenised cream according to claim 7 wherein the stailiser is an iota-carragheenate, in which about 15% by weight of orthophosphate are present.

35. Whippable, non-homogenised cream according to claim 7 wherein the cream contains 0.05% by weight of a stabiliser.

36. Whippable, non-homogenised cream according to claim 8 wherein the stabiliser is an iota-carragheenate, in which about 15% by weight of orthophosphate are present.

37. Whippable, non-homogenised cream according to claim 8 wherein the cream contains 0.05% by weight of a stabiliser.

38. Whippable, non-homogenised cream according to claim 9 wherein the cream contains 0.05% by weight of a stabiliser.

39. Method for the preparation of whippable cream having a fat content of 20 to 30% by weight and a pH of 6.2 to 6.5, comprising dispersing in milk with thorough stirring at least one emulsifying agent consisting of a mixture of distilled monoglycerides in hydrogenated soya oil, wherein the weight ratio of saturated to unsaturated fatty acids in the fatty acid ester is between 80:20 and 20:80, a binder selected from the group consisting of modified water soluble starch and cold soluble starch varieties, at least one organic and physiologically acceptable acid and a carragheenate as a stabilizer, and combining amounts of this dispersion(s) with an amount of non-homogenised cream such that the final mixture has a fat content of 20 to 30%, the content of emulsifying agent and of binder is 0.2 to 0.4% by weight in each case, the content of stabiliser is 0.03 to 0.06% by weight, and a pH of 6.2 to 6.5.

40. Method according to claim 39, wherein whole milk is used for dispersing the emulsifying agents and/or binders and/or stabilisers.

41. Method according to claims 39 to 40, wherein pasteurised cream having a fat content of 40% by weight is used for adjusting the desired fat content in the final product.

42. Method according to claim 39 or 40, wherein a 50 percent by weight solution of Lactic acid in water is used for adjusting the desired pH in the final product.

43. Method according to claim 39 or 40, wherein the fat content of the final product is adjusted to 25% by weight.

44. Method according to claim 39 or 40, wherein the pH of the final product is adjusted to 6.3.

45. Method according to claim 39 or 40, wherein the emulsifying agent used consists of a mixture of distilled monoglycerides and 20% by weight of hydrogenated soya oil.

46. Method according to claim 39 or 40, wherein the emulsifying agent used consists of a mixture of distilled monoglycerides and soya oil, wherein 71% by weight of the fatty acid ester consists of saturated fatty acid; and 29% by weight consists of unsaturated fatty acids.

47. Method according to claim 39 or 40, wherein the binder used is a modified water-soluble starch.

48. Method according to claim 39 or 40, wherein the stabiliser used is an iota-carragheenate which contains about 15% by weight of orthophosphate.

49. Method according to claim 39 or 40, wherein the prepared whippable cream is pasteurised and subsequently cooled to 10° C. or lower.

50. Method according to claim 39 or 40, wherein the prepared whippable cream is pasteurised at 115° C. for 30 seconds and subsequently cooled to 10° C. or lower.

51. Method according to claim 41 wherein a 50% by weight solution of Lactic acid in water is used for adjusting the desired pH in the final product.

52. Method according to claim 41 wherein the fat content of the final product is adjusted to 25% by weight.

53. Method according to claim 41 wherein the pH of the final product is adjusted to 6.3.

54. Method according to claim 41 wherein the emulsifying agent used consists of a mixture of distilled monoglycerides and 20% by weight of hydrogenated soya oil.

55. Method according to claim 41 wherein the emulsifying agent used consists of a mixture of distilled monoglycerides and soya oil, wherein 71% by weight of the fatty acid ester consists of saturated fatty acids and 29% by weight consists of unsaturated fatty acids.

56. Method according to claim 41 wherein the binder used is a modified water-soluble starch.

57. Method according to claim 41 wherein the stabiliser used is an iota-carragheenate which contains about 15% by weight of orthophosphate.

58. Method according to claim 41 wherein wherein the prepared whippable cream is pasteurised and subsequently cooled to 10° C. or lower.

59. Method according to claim 41 wherein the prepared whippable cream is pasteurised at 115° C. for 30 seconds and subsequently cooled to 10° C. or lower.

60. Method according to claim 42 wherein the fat content of the final product is adjusted to 25% by weight.

61. Method according to claim 42 wherein the pH of the final product is adjusted to 6.3.

62. Method according to claim 42 wherein the emulsifying agent used consists of a mixture of distilled monoglycerides and 20% by weight of hydrogenated soya oil.

63. Method according to claim 14 wherein the emulsifying agent used consists of a mixture of distilled monoglycerides and soya oil, wherein 71% by weight of the fatty acid ester consists of saturated fatty acids and 29% by weight consists of unsaturated fatty acids.

64. Method according to claim 42 wherein the binder used is a modified water-soluble starch.

65. Method according to claim 42 wherein the stabiliser used is an iota-carragheenate which contains about 15% by weight of orthophosphate.

66. Method according to claim 42 wherein the prepared whippable cream is pasteurized and subsequently cooled to 10° C. or lower.

67. Method according to claim 42 wherein the prepared whippable cream is pasteurized at 115° C. for 30 seconds and subsequently cooled to 10° C. or lower.

68. Method according to claim 43 wherein the pH of the final product is adjusted to 6.3.

69. Method according to claim 43 wherein the emulsifying agent used consists of a mixture of distilled monoglycerides and 20% by weight of hydrogenated soya oil.

70. Method according to claim 43 wherein the emulsifying agent used consists of a mixture of distilled monoglycerides and soya oil, wherein 71% by weight of the fatty acid ester consists of saturated fatty acids and 29% by weight consists of unsaturated fatty acids.

71. Method according to claim 43 wherein the binder used is a modified water-soluble starch.

72. Method according to claim 43 wherein the stabiliser used is an iota-carragheenate which contains about 15% by weight of orthophosphate.

73. Method according to claim 43 wherein the prepared whippable cream is pasteurised and subsequently cooled to 10° C. or lower.

74. Method according to claim 43 wherein the prepared whippable cream is pasteurised at 115° C. for 30 seconds and subsequently cooled to 10° C. or lower.

75. Method according to claim 44 wherein the emulsifying agent used consists of a mixture of distilled monoglycerides and 20% by weight of hydrogenated soya oil.

76. Method according to claim 44 wherein the emulsifying agent used consists of a mixture of distilled monoglycerides and soya oil, wherein 71% by weight of the fatty acid ester consists of saturated fatty acids and 29% by weight consists of unsaturated fatty acids.

77. Method according to claim 44 wherein the binder used is a modified water-soluble starch.

78. Method according to claim 44 wherein the stabiliser used is an iota-carragheenate which contains about 15% by weight of orthophosphate.

79. Method according to claim 44 wherein the prepared whippable cream is pasteurised and subsequently cooled to 10° C. or lower.

80. Method according to claim 44 wherein the prepared whippable cream is pasteurised at 115° C. for 30 seconds and subsequently cooled to 10° C. or lower.

81. Method according to claim 45 wherein the emulsifying agent used consists of a mixture of distilled monoglycerides and soya oil, wherein 71% by weight of the fatty acid ester consists of saturated fatty acids and 29% by weight consists of unsaturated fatty acids.

82. Method according to claim 45 wherein the binder used is a modified water-soluble starch.

83. Method according to claim 45 wherein the stabiliser used is an iota-carragheenate which contains about 15% by weight of orthophosphate.

84. Method according to claim 45 wherein the prepared whippable cream is pasteurised and subsequently cooled to 10° C. or lower.

85. Method according to claim 45 wherein the prepared whippable cream is pasteurised at 115° C. for 30 seconds and subsequently cooled to 10° C. or lower.

86. Method according to claim 46 wherein the binder used is a modified water-soluble starch.

87. Method according to claim 46 wherein the stabiliser used is an iota-carragheenate which contains about 15% by weight of orthophosphate.

88. Method according to claim 46 wherein the prepared whippable cream is pasteurised and subsequently cooled to 10° C. or lower.

89. Method according to claim 46 wherein the prepared whippable cream is pasteurised at 115° C. for 30 seconds and subsequently cooled to 10° C. or lower.

90. Method according to claim 47 wherein the stabiliser used is a iota-carragheenate which contains about 15% by weight of orthophosphate.

91. Method according to claim 47 wherein the whippable cream is pasteurized and subsequently cooled to 10° C. or lower.

92. Method according to claim 47 wherein the prepared whippable cream is pasteurized at 113° C. for 30 seconds and subsequently cooled to 10° C. or lower.

93. Method according to claim 48 wherein the prepared whippable cream is pasteurised and subsequently cooled to 10° C. or lower.

94. Method according to claim 48 wherein the prepared whippable cream is pasteurised at 115° C. for 30 seconds and subsequently cooled to 10° C. or lower.

* * * * *